United States Patent
Choi

(10) Patent No.: US 9,392,091 B2
(45) Date of Patent: Jul. 12, 2016

(54) HANDS-FREE APPARATUS FOR VEHICLE AND METHOD OF CONTROLLING THE SAME

(71) Applicants: HYUNDAI MOTOR COMPANY, Seoul (KR); KIA MOTORS CORPORATION, Seoul (KR)

(72) Inventor: Hyun Woo Choi, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/918,120

(22) Filed: Oct. 20, 2015

(65) Prior Publication Data

US 2016/0112556 A1 Apr. 21, 2016

(30) Foreign Application Priority Data

Oct. 20, 2014 (KR) ........................ 10-2014-0141644

(51) Int. Cl.
*H04M 1/00* (2006.01)
*H04M 1/60* (2006.01)
*H04W 76/06* (2009.01)

(52) U.S. Cl.
CPC ............ *H04M 1/6075* (2013.01); *H04W 76/06* (2013.01)

(58) Field of Classification Search
None
See application file for complete search history.

(56) References Cited

U.S. PATENT DOCUMENTS

| | | | | |
|---|---|---|---|---|
| 6,337,621 | B1* | 1/2002 | Ogino | B60R 25/1004 307/10.2 |
| 8,369,903 | B2* | 2/2013 | Saitoh | H04M 1/274516 455/344 |
| 8,565,837 | B2* | 10/2013 | Yi | H04L 12/1467 370/310.2 |
| 2003/0003892 | A1* | 1/2003 | Makinen | B60R 25/24 455/345 |
| 2004/0059979 | A1* | 3/2004 | Palm | H04L 5/1438 714/748 |
| 2004/0165572 | A1* | 8/2004 | Park | H04L 1/0015 370/349 |

(Continued)

FOREIGN PATENT DOCUMENTS

| | | |
|---|---|---|
| JP | 2004-147266 A | 5/2004 |
| JP | 2005-110049 A | 4/2005 |

(Continued)

OTHER PUBLICATIONS

Car Working Group, "Hands-Free Profile 1.5", Revision V10r00, Nov. 25, 2005, pp. 1-93.

(Continued)

*Primary Examiner* — Dominic Rego
(74) *Attorney, Agent, or Firm* — McDermott Will & Emery LLP

(57) ABSTRACT

A method of controlling a hands-free system for a vehicle includes connecting with a cellular phone through local area communication. A call conversation state is entered when a hands-free function activates. A call termination command is received from a driver. A call termination message is transmitted to the connected cellular phone. When a success message is not received from the connected cellular phone in response to the call termination message, the call termination message is retransmitted by a preset number of times until the success message is received.

20 Claims, 5 Drawing Sheets

(56) References Cited

U.S. PATENT DOCUMENTS

| | | | | |
|---|---|---|---|---|
| 2005/0070245 | A1* | 3/2005 | Nath | G08B 21/06 455/345 |
| 2005/0234604 | A1* | 10/2005 | Nakamura | B60R 16/0231 701/2 |
| 2006/0003762 | A1* | 1/2006 | Sumcad | H04H 20/51 455/428 |
| 2006/0045063 | A1* | 3/2006 | Stanford | H04W 84/16 370/345 |
| 2007/0055225 | A1* | 3/2007 | Dodd, III | A61B 18/14 606/34 |
| 2008/0313518 | A1* | 12/2008 | Naoe | H04L 1/16 714/748 |
| 2010/0009666 | A1* | 1/2010 | Kim | G06Q 10/02 455/417 |
| 2011/0151783 | A1* | 6/2011 | Lai | H04M 1/6041 455/41.2 |
| 2014/0195108 | A1* | 7/2014 | Schumacher | G07C 5/008 701/36 |
| 2015/0195393 | A1* | 7/2015 | Sinha | H04M 1/6066 455/414.1 |

FOREIGN PATENT DOCUMENTS

| | | |
|---|---|---|
| JP | 2011-101198 A | 5/2011 |
| KR | 10-2006-0015979 A | 2/2006 |
| KR | 10-2006-0043950 A | 5/2006 |
| KR | 10-2007-0026143 A | 3/2007 |
| KR | 10-0882675 B1 | 2/2009 |
| KR | 10-2009-0098862 A | 9/2009 |
| KR | 10-2012-0009189 A | 2/2012 |

OTHER PUBLICATIONS

Korean Office Action issued in Korean Application No. 10-2014-0141644 dated Jun. 19, 2015.

* cited by examiner

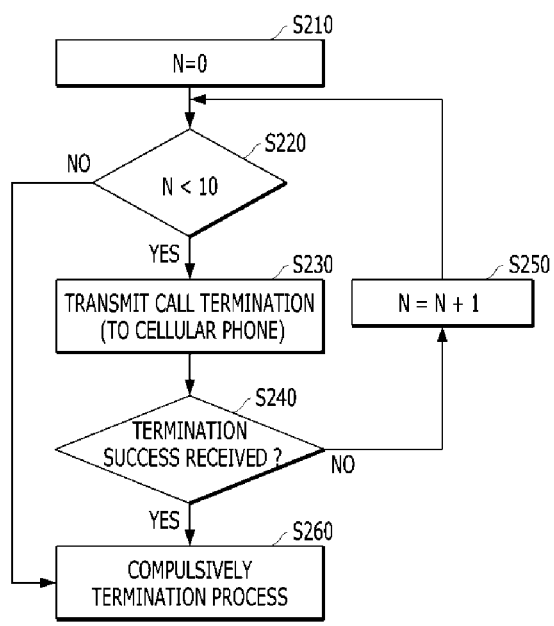

HANDS-FREE APPARATUS FOR VEHICLE AND METHOD OF CONTROLLING THE SAME

CROSS-REFERENCE TO RELATED ART

This application claims the benefit of priority to Korean Patent Application No. 10-2014-0141644, filed on Oct. 20, 2014, which is hereby incorporated by reference as if fully set forth herein.

TECHNICAL FIELD

The present disclosure relates to a method and an apparatus for ensuring a reliable operation of a hands-free system provided in a vehicle audio or navigation system.

BACKGROUND

Recently, the use of a hands-free conversation function connected to a driver's cellular phone via Bluetooth communication has been widely used in a vehicle to ensure stability during car driving as well as a convenience function. The hands-free conversation is embodied through a microphone and a speaker of a vehicle, and thus is provided through an audio or navigation system (i.e., AVN or a head unit). However, the hands-free conversation may frequently maintain a call conversation state when a telephone conversation does not terminate normally due to a cellular phone itself or a wireless network environment. This causes a malfunction whereby media reproduction sound or navigation guidance voice is not output, or the use of a voice recognition function is restricted and causes confusion to a driver, thereby increasing danger of an accident.

SUMMARY

The present disclosure is directed to a hands-free apparatus for a vehicle and a method of controlling the same that substantially obviates one or more problems due to limitations and disadvantages of the related art.

An aspect of the present inventive concept provides a hands-free system for a vehicle and a method of controlling the same, for providing high reliability.

Another aspect of the present inventive concept provides a hands-free system for a vehicle and a method of controlling the same, for reliably performing call termination processing in a vehicle when a call conversation is terminated while a hands-free function associated with Bluetooth between a vehicle and a cellular phone is executed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In accordance with an embodiment of the prevent inventive concept, a method of controlling a hands-free system for a vehicle includes: connecting with a cellular phone through local area communication; entering a call conversation state when a hands-free function activates; receiving a call termination command from a driver; transmitting a call termination message to the connected cellular phone; and retransmitting, when a success message is not received from the connected cellular phone in response to the call termination message, the call termination message by a preset number of times until the success message is received.

In accordance with another embodiment of the present inventive concept, a hands-free system for a vehicle includes: a local area communicator configured to exchange a signal with a cellular phone through local area communication; a user input configured to receive a call termination command from a driver during a call conversation state after a hands-free function activates; and a controller configured to control the local area communicator to transmit a call termination message to the connected cellular phone upon receiving the call termination command and to control the local area communicator to retransmit, when a success message is not received from the connected cellular phone in response to the call termination message, the call termination message by a preset number of times until the success message is received.

In accordance with another embodiment of the present inventive concept, an audio/video/navigation (AVN) system for a vehicle for providing a hands-free function includes: a Bluetooth module paired with a cellular phone and exchanging a signal with the cellular phone; a controller configured to execute the hands-free function with respect to a call performed through the paired cellular phone; and a user input configured to receive a call termination command from a driver during a call conversation state when the hands-free function is executed. The controller controls the Bluetooth module to transmit a call termination message to the cellular phone upon receiving the call termination command, and to control the local area communicator to retransmit, when a success message is not received from the connected cellular phone in response to the call termination message, the call termination message by a preset number of times until the success message is received.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 2 is a flowchart illustrating an example of retransmission of a call terminate message and a compulsory termination procedure according to excess of a maximum retransmission number of times according to an embodiment of the present inventive concept.

DETAILED DESCRIPTION

Hereinafter, a hands-free system for a vehicle according to embodiments of the present inventive concept will be described in more detail with reference to the attached drawings. The suffixes "module" and "unit" of elements of an electronic vehicle are used for convenience of description and thus can be used interchangeably and do not have any distinguishable meanings or functions.

First, an operation of a general hands-free system will be described with reference to FIG. 1.

Figure 1:
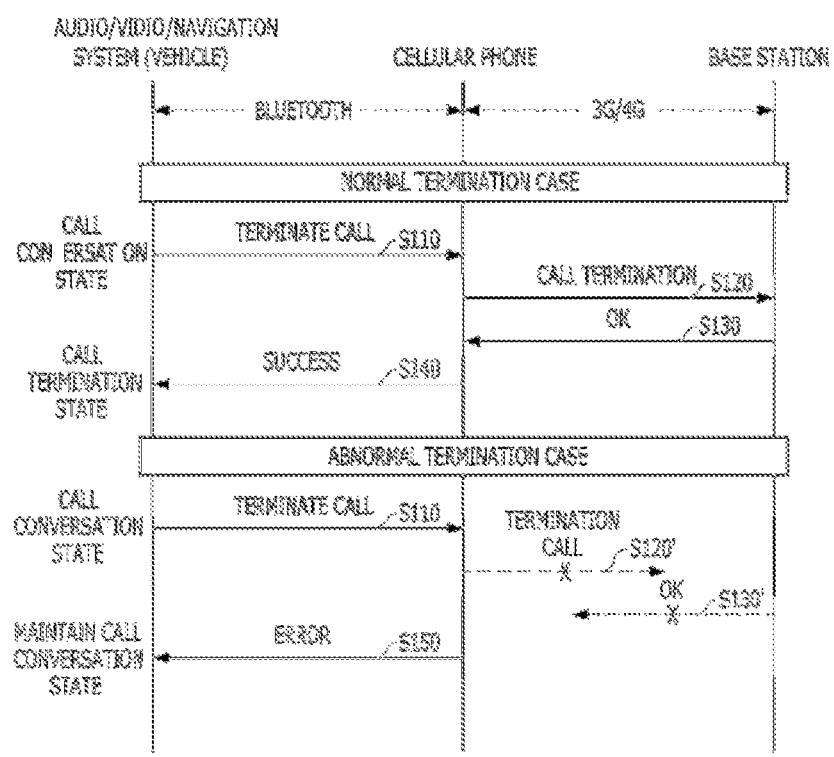
FIG. 1 is a flowchart of a call termination procedure of a general hands-free system.

FIG. 1 is a flowchart of a call termination procedure of a general hands-free system.

In the following diagrams including FIG. 1, a hands-free function may be provided through an audio/video/navigation system of a vehicle. Needless to say, this assumption is for convenience of description, and it would be obvious to one of ordinary skill in the art that a hands-free function may be also provided by a different separate vehicle component.

Referring to FIG. 1, an audio/video/navigation system and a cellular phone are connected to each other through local area wireless communication such as Bluetooth, and the cellular phone is connected to a base station via a wireless communication method (e.g., 3G/4G, etc.). Here, when call is connected, the cellular phone outputs a sound signal (e.g., calling voice of the other user) received from a base station through a speaker of a vehicle and transmits a sound signal (e.g., driver's voice) input through a microphone of the vehicle, to the base station.

During a call conversation, when a driver wants to stop the call conversation, the call conversation may terminates normally according to the user intention or may not terminates normally according to a radio wave situation between a cellular phone and a base station. First, a normal termination case will be described.

In a case of the normal terminal, when call termination is executed (e.g., a driver manipulates a call terminating button installed in the vehicle) in a vehicle during a call conversation, the audio/video/navigation system transmits a call terminate message to the cellular phone (S110).

When the cellular phone transmits a call terminate message to a base station of a corresponding telecommunication company (S120) and the base station transmits an O.K. message to the cellular phone in response to the call terminate message (S130), the cellular phone transmits success in call termination to the vehicle through a call termination success message (S140).

However, in the abnormal termination case, when the base station does not receive the call terminate message transmitted from the cellular phone due to an influence (e.g., entrance into a weak electric-field area or a shadow area) of a wireless network between the cellular phone and the base station of the telecommunication company (S120') or the base station does not receive the O.K. message transmitted from the base station even if the base station receives the call terminate message (S130'), the cellular phone determines that the call does not terminate normally and transmits an error message to the vehicle (S150). In this case, a hands-free function does not terminate normally in the audio/video/navigation system of the vehicle, and accordingly sound, etc. of other media and navigation players may not be output normally.

To overcome this problem, the present disclosure proposes a method in which a vehicle system (an audio or navigation system) retransmits a call terminate message preset number of times when the vehicle system does not receive a call termination success message from the cellular phone in response to a call termination command transmitted to the cellular phone (that is, when the vehicle system receives an error message), and a hands-free function compulsively terminates when the success message is not received up to a maximum retransmission number of times.

In this case, when the call termination success message is not received from the cellular phone up to a maximum retransmission number of times, the hands-free function compulsively terminates, and thus, guidance sounds of media and navigation players of a normal vehicle may be output later, and a normal operation of a voice recognition function may be ensured.

An algorithm for this will be described with reference to FIG. 2.

FIG. 2 is a flowchart illustrating an example of retransmission of a call terminate message and a compulsory termination procedure according to excess of a maximum retransmission number of times according to an embodiment of the present invention.

In FIG. 2, it is assumed that a vehicle and a cellular phone are connected via Bluetooth, and a driver selects call termination in a call connection state. In addition, the maximum transmission number of times is assumed to be 10 times.

Referring to FIG. 2, a retransmission counter N of a first call termination message is set to 0 (S210).

When a retransmission counter N is smaller than N according to call termination selection of a driver (S220), the call terminate message is transmitted to the cellular phone (S230), and when the call termination success message is not received in response to the transmitted call termination message (S240), retransmission is restarted as a retransmission counter is increased by 1 (S250). When the call termination success message is received from the cellular phone before N reaches 10 or when N reaches 10 (i.e., transmission is performed ten times), a call conversation state may be transited to a call termination state irrespective of whether the call termination success message is received (S260).

The procedure described with reference to FIG. 2 will be described again through a message exchanging procedure between a vehicle and a cellular phone with reference to FIGS. 3A and 3B.

Figure 3A:
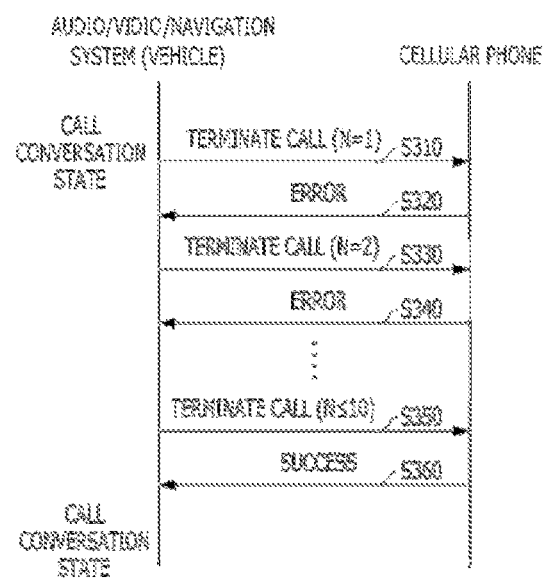
FIG. 3A is a diagram illustrating an example of a call termination procedure when a call termination success message is received before a maximum retransmission number of times is reached according to an embodiment of the present inventive concept.

FIG. 3A is a diagram illustrating an example of a call termination procedure when a call termination success message is received before a maximum retransmission number of times is reached according to an embodiment of the present invention. FIG. 3B is a diagram illustrating an example of a call termination procedure when a call termination success message is not received and a maximum retransmission number of times is reached.

Referring to FIG. 3A, a vehicle first (N=1) transmits a call termination message to a cellular phone (S310). Upon receiving an error message in response to the first transmission (S320), the vehicle initiates (N=2) retransmission of the call termination message (S330). Upon also receiving an error message for retransmission (S340), when the vehicle does not receive a success message, the vehicle performs retransmission until N reaches 10 (S350). When the success message is received from the cellular phone before a transmission number of times exceeds 10 (S360), an audio/video/navigation system may be transited to a call termination state normally.

Figure 3B:
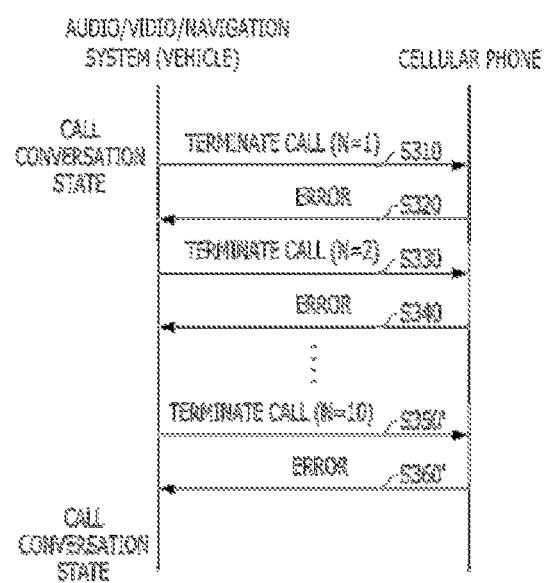
FIG. 3B is a diagram illustrating an example of a call termination procedure when a call termination success message is not received and a maximum retransmission number of times is reached.

Next, referring to FIG. 3B, up to operation S340, FIG. 3B is similar to FIG. 3A. However, although the vehicle performs retransmission until N reaches 10 as the success message is not received (S350'), when the success message is not received (S360'), the audio/video/navigation system may be compulsively transited to a call termination state.

Hereinafter, a configuration of a vehicle for embodying the aforementioned embodiments will be described.

Figure 4:
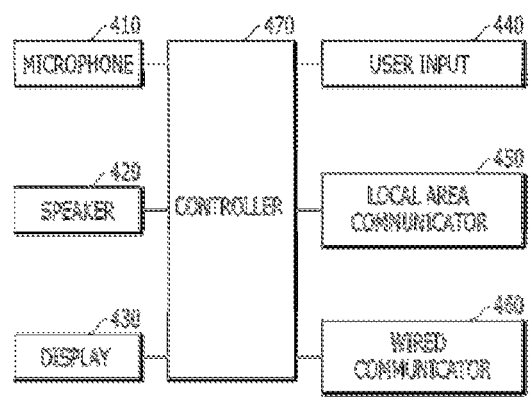
FIG. 4 is a block diagram illustrating an example of a configuration of a hands-free system for a vehicle according to an embodiment of the present inventive concept.

FIG. 4 is a block diagram illustrating an example of a configuration of a hands-free system for a vehicle according to an embodiment of the present inventive concept.

As described above, the hands-free system according to the present disclosure may be embodied through an audio/video/navigation system of a vehicle. Needless to say, the hands-free system may be embodied as a separate system for performing a hands-free function or as a system that shares some components of the audio/video/navigation system. Accordingly, components illustrated in FIG. 4 may be at least some components of the audio/video/navigation system.

Referring to FIG. 4, the hands-free system includes a microphone 410, a speaker 420, a display 430, a user input 440, a local area communicator 450, a wired communicator 460, and a controller 470. Components illustrated in FIG. 4 are not necessary to embody the hands-free system, and thus, the hands-free system described above in the specification may have greater or fewer components than the aforementioned components.

Each component will now be described in more detail. The microphone 410 may convert driver voice into an electrical signal corresponding thereto, and the speaker 420 may output media sound, various warning sounds, navigation guidance voice, and so on. When a hands-free function is activated, the speaker 420 may replace a function performed by a speaker of a cellular phone.

The display 430 may visually output map information during a navigation operation, content related information during media reproduction, state information associated with vehicle driving, and so on, and may display call related information (e.g., call conversation time and information of the other user) when the hands-free function activates.

The user input 440 may be a component for receiving various commands from a driver and may include a push type button, a dial, a jog shuttle, a touch sensor, a lever switch, a toggle switched, or the like. The user input 440 may be integrated with the display 430 to constitute a touchscreen. When the hands-free function is activated, the driver may select whether a call conversation terminates through the user input 440.

The local area communicator 450 may pair with a cellular phone through a local area communication method such as Bluetooth to exchange data. When the hands-free function activates, the local area communicator 450 may transmit driver voice input through the microphone 410 and receive voice of the other user of the call conversation from the cellular phone. In particular, the local area communicator 450 may exchange a call termination message and an error/success message with the cellular phone when the hands-free function is activated.

The wired communicator 460 may exchange a signal with another controller of the vehicle and may include a CAN/CAN FD transceiver, an Ethernet module, or the like.

The controller 470 controls an overall operation of the aforementioned components, and controls the local area communicator 450 to transmit a call termination message to a cellular phone upon receiving a call termination command through the user input 440 during a call conversation when a hands-free function activates. In addition, the controller 470 may control the local area communicator 450 to retransmit a call termination message by a preset number of times when a success message is not received, for example, an error message is received from the cellular phone through the local area communicator 450. Although retransmission of the call termination message is performed by a preset number of times, when the success message is not received, the controller 180 may compulsively transit a current state to a call termination state such that the microphone 410 and the speaker 420 receive or do not output sounds associated with the hands-free function.

In the aforementioned embodiments, when a cellular phone does not receive an O.K. message from a base station, the cellular phone may not to transmit an error message to the vehicle. In this case, when the vehicle does not receive a success message for a predetermined period of time from transmission of the call termination message (for example, when an error message is received), the corresponding transmission may fail and a retransmission counter may increase by 1.

With regard to the aforementioned time synchronization method, the aforementioned configurations and methods according to the embodiments of the present inventive concept may be entirely or partially embodied and configured so as to modify the embodiments in various ways rather than being restrictedly limited.

According to the present disclosure, a hands-free system for a vehicle may provide higher reliability.

In particular, according to the present, when an error message is received in response to a call termination message, a call termination message may be repeatedly transmitted, and when a repetition number of times exceeds a preset transmission number of times, a current state is compulsively transited to a call termination state, call termination processing may be reliably performed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a hands-free system for a vehicle, the method comprising:
   connecting with a cellular phone through local area communication;
   entering a call conversation state when a hands-free function activates;
   receiving a call termination command from a driver;
   transmitting a call termination message to the connected cellular phone; and
   retransmitting, when a success message is not received from the connected cellular phone in response to the call termination message, the call termination message by a preset number of times until the success message is received.

2. The method according to claim 1, further comprising compulsively transiting the call conversation state to a call termination state when the success message is not received from the connected cellular phone after the call termination message is retransmitted by the preset number of times.

3. The method according to claim 2, further comprising outputting a media sound or a navigation guidance voice after the step of compulsive transiting.

4. The method according to claim 1, wherein the step of retransmitting is performed upon receiving an error message from the connected cellular phone in response to an immediately transmitted call termination message.

5. The method according to claim 1, wherein the step of retransmitting is performed when a response to an immediately transmitted call termination message is not received for a predetermined time period or more from the connected cellular phone.

6. The method according to claim 1, wherein the success message indicates that the connected cellular phone terminates a call normally with a base station.

7. The method according to claim 1, further comprising shutting off an output of media sound or an output of navigation guidance voice during the call conversation state.

8. The method according to claim 1, wherein the call conversation state is maintained until the success message is received.

9. The method according to claim 1, wherein the hands-free system comprises an audio/video/navigation (AVN) system.

10. A hands-free system for a vehicle, comprising:
a local area communicator configured to exchange a signal with a cellular phone through local area communication;
a user input configured to receive a call termination command from a driver during a call conversation state after a hands-free function is activated; and
a controller configured to control the local area communicator to transmit a call termination message to the cellular phone connected with the local area communication upon receiving the call termination command, and to control the local area communicator to retransmit, when a success message is not received from the connected cellular phone in response to the call termination message, the call termination message by a preset number of times until the success message is received.

11. The hands-free system according to claim 10, wherein the controller compulsively transits the call conversation state to a call termination state when the success message is not received from the connected cellular phone after the call termination message is retransmitted by the preset number of times.

12. The hands-free system according to claim 11, wherein the controller starts outputting a media sound or navigation guidance voice after the controller compulsive transits the call conversation state.

13. The hands-free system according to claim 10, wherein the controller retransmits the call termination message upon receiving an error message from the connected cellular phone in response to an immediately transmitted call termination message.

14. The hands-free system according to claim 10, wherein the controller retransmits the call termination message when a response to an immediately transmitted call termination message is not received for a predetermined time period or more from the connected cellular phone.

15. The hands-free system according to claim 10, wherein the success message indicates that the connected cellular phone terminates call termination normally with a base station.

16. The hands-free system according to claim 10, further comprising a speaker for outputting a media sound or navigation guidance voice,
wherein the controller shuts off the media sound or navigation guidance voice output through the speaker during the call conversation state.

17. The hands-free system according to claim 10, wherein the preset number of times is 10 times.

18. The hands-free system according to claim 10, wherein the controller maintains the call conversation state until the success message is received before the call termination message is retransmitted by the preset number of times.

19. The hands-free system according to claim 10, wherein the controller includes an AVN system.

20. An audio/video/navigation (AVN) system for a vehicle for providing a hands-free function, the AVN system comprising:
a Bluetooth module paired with a cellular phone and configured to exchange a signal with the cellular phone;
a controller configured to execute the hands-free function with respect to a call performed through the paired cellular phone; and
a user input configured to receive a call termination command from a driver during a call conversation state when the hands-free function is executed,
wherein the controller controls the Bluetooth module to transmit a call termination message to the cellular phone upon receiving the call termination command, and to control a local area communicator to retransmit, when a success message is not received from the cellular phone in response to the call termination message, the call termination message by a preset number of times until the success message is received.

* * * * *